US012612524B2

(12) United States Patent
Winsberg et al.

(10) Patent No.: US 12,612,524 B2
(45) Date of Patent: Apr. 28, 2026

(54) AQUEOUS BASECOAT COMPOSITION COMPRISING A SILANE-BASED ADDITIVE AND HAVING IMPROVED ADHESION PROPERTIES AND MULTILAYER COATINGS PRODUCED FROM SAID BASECOAT COMPOSITIONS

(71) Applicant: BASF COATINGS GMBH, Münster (DE)

(72) Inventors: Jan Winsberg, Münster (DE); Guenter Klein, Münster (DE); Claas Henrik Hoevelmann, Münster (DE); Christian Alter, Münster (DE); Stefanie Schroeder, Münster (DE); Melanie Glomb, Münster (DE); Ulrike Wenking, Münster (DE)

(73) Assignee: BASF COATINGS GMBH, Muenster (DE)

( * ) Notice: Subject to any disclaimer, the term of this patent is extended or adjusted under 35 U.S.C. 154(b) by 886 days.

(21) Appl. No.: 17/755,860

(22) PCT Filed: Nov. 3, 2020

(86) PCT No.: PCT/EP2020/080767
§ 371 (c)(1),
(2) Date: May 10, 2022

(87) PCT Pub. No.: WO2021/094131
PCT Pub. Date: May 20, 2021

(65) Prior Publication Data
US 2022/0403185 A1      Dec. 22, 2022

(30) Foreign Application Priority Data
Nov. 15, 2019    (EP) ..................................... 19209373

(51) Int. Cl.
| | |
|---|---|
| *C09D 7/00* | (2018.01) |
| *B05D 7/00* | (2006.01) |
| *C08G 18/80* | (2006.01) |
| *C09D 7/63* | (2018.01) |
| *C09D 7/80* | (2018.01) |

(52) U.S. Cl.
CPC .............. *C09D 7/63* (2018.01); *B05D 7/532* (2013.01); *C08G 18/809* (2013.01); *C09D 7/80* (2018.01); *B05D 2425/02* (2013.01); *B05D 2503/00* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 6,555,612 B1 * | 4/2003 | Mayer ................ | C08G 18/4288 524/591 |
| 10,081,738 B2 | 9/2018 | Groenewolt et al. | |
| 10,836,927 B2 | 11/2020 | Reuter et al. | |
| 10,920,100 B2 | 2/2021 | Corten et al. | |
| 2003/0032719 A1 | 2/2003 | Sapper | |
| 2008/0220173 A1 | 9/2008 | Poppe et al. | |
| 2011/0245406 A1 * | 10/2011 | Klein ................... | C08G 18/809 427/407.1 |

FOREIGN PATENT DOCUMENTS

| | | |
|---|---|---|
| DE | 4110520 A1 | 10/1992 |
| EP | 3966271 A1 | 3/2022 |
| WO | 2014086529 A1 | 6/2014 |
| WO | 2016091539 A1 | 6/2016 |
| WO | 2017088988 A1 | 6/2017 |
| WO | 2020225310 A1 | 11/2020 |
| WO | 2021018594 A1 | 2/2021 |

OTHER PUBLICATIONS

European Search Report for EP Patent Application No. 19209373.0, Issued on May 29, 2020, 3 pages.
Hermann Römpp, "Römpp Lexikon, Lacke und Druckfarben", 1998, p. 176 and 451.
International Search Report and Written Opinion for corresponding PCT/EP2020/080767 mailed Dec. 9, 2020, 10 pages.

* cited by examiner

*Primary Examiner* — Stefanie J Cohen
(74) *Attorney, Agent, or Firm* — Armstrong Teasdale LLP

(57)            ABSTRACT

Described herein is an aqueous basecoat composition including a silane-based additive as hardener/self-crosslinking material to improve adhesion of the basecoat to the under- and overlying coating layers, as well as the cohesion property of the basecoat itself. Also described herein is a mixer system for preparing an aqueous refinish basecoat composition including at least one base color component, at least one pigment-free component, at least one hardening component including the silane-based additive and optionally at least one rheology module as well as a method to prepare an aqueous basecoat composition from said mixer system. Further, described herein is a method of coating a substrate with the basecoat composition and a clearcoat composition and jointly curing the basecoat and clearcoat composition as well as to a coated substrate obtained from the method. Finally, described herein is a method of using the silane-based compound as hardening additive in aqueous basecoat compositions.

15 Claims, No Drawings

AQUEOUS BASECOAT COMPOSITION COMPRISING A SILANE-BASED ADDITIVE AND HAVING IMPROVED ADHESION PROPERTIES AND MULTILAYER COATINGS PRODUCED FROM SAID BASECOAT COMPOSITIONS

CROSS-REFERENCE TO RELATED APPLICATIONS

This application is a U.S. National Phase Application of PCT/EP2020/080767, filed Nov. 3, 2020, which claims the benefit of priority to European Patent Application No. 19209373.0, filed Nov. 15, 2019, the entire contents of which is hereby incorporated by reference herein.

The present invention relates to an aqueous basecoat composition comprising a specific silane-based additive as hardener/self-crosslinking material to improve the adhesion of the basecoat to the under- and overlying coating layers, as well as the cohesion property of the basecoat itself. The present invention further relates to a mixer system for preparing an aqueous refinish basecoat composition comprising at least one base color component, at least one pigment-free component, at least one hardening component comprising the silane-based additive and optionally at least one rheology module as well as a method to prepare an aqueous basecoat composition from said mixer system. The present invention further relates to a method of coating a substrate with the inventive basecoat composition and a clearcoat composition and jointly curing the basecoat and clearcoat composition as well as to a coated substrate obtained from the inventive process. The present invention finally relates to the use of the silane-based compound as hardening additive in aqueous basecoat compositions.

STATE OF THE ART

In today's coating industry, the application of isocyanates as crosslinkers and tin catalysts becomes more and more undesired because legal classifications and maximum permissible values are getting critical.

However, polyisocyanates are commonly used crosslinker materials in many coating systems. Reasonable alternatives that fulfill future environmental, health and safety requirements, and also technological minimum requirements are not yet available. In order to increase the economic efficiency of the coating process, quickly low-temperature-curing coating systems are desired.

All these requirements cannot be fulfilled with standard (polyisocyanate) crosslinked coatings. The utilization of alkoxy silane-containing materials for the formulation of low temperature-curing clear- and basecoats is a reasonable approach to address these points and replace polyisocyanates, since the condensation reaction of alkoxy silanes can be catalyzed tin-free and curing at ambient conditions is achievable.

When ambient curing isocyanate-free or isocyanate-containing clearcoats, for example isocyanate-free clearcoats disclosed in unpublished patent application EP 19172732, are used in combination with low temperature-curing basecoat systems such as refinish basecoats, weak steam jet adhesion is observed. To fulfill OEM minimum requirements concerning stem jet adhesion, an additional hardener additive is required in the basecoat formulation. This hardener additive is usually a commonly used polyisocyanate hardener since commercially available alkoxysilane materials do not lead to the steam jet adhesion required to fulfill OEM minimum requirements. However, the use of polyisocyanate hardeners in basecoat compositions is not desirable as outlined previously.

Of advantage accordingly would be a preferably isocyanate-free aqueous basecoat composition which has improved steam jet adhesion to an ambient curing isocyanate-free or isocyanate-containing. Said basecoat composition should have a high pot life and should be low temperature-curing so that it can be used in OEM repair and refinish processes.

OBJECT

The object of the present invention, accordingly, was that of providing a fast curing aqueous basecoat composition which can be cured at low temperatures without the use of isocyanate or aminoplast crosslinkers. The coating composition should be particularly suitable in automotive coating such as automotive OEM and automotive refinish coating. The coating should have a high pot life and should exhibit improved steam jet adhesion in combination with low temperature-curing clearcoats. Moreover, the coating composition should result in basecoats having good optical and coloristic properties.

TECHNICAL SOLUTION

The objects described above are achieved by the subject matter claimed in the claims and also by the preferred embodiments of that subject matter that are described in the description hereinafter.

A first subject of the present invention is therefore an aqueous coating composition comprising:

a) at least one silane-based compound R having an isocyanate content of less than 1% obtained by reacting the free isocyanate groups of at least one aliphatic, cycloaliphatic, araliphatic and aromatic polyisocyanate with at least one silane $$HN\left[X - SiR_a^1(OR^2)_{3-a}\right]_n\left[X' - SiR_b^1(OR^2)_{3-b}\right]_m\left[R^3\right]_{2-(m+n)} \quad (I)$$

wherein

X, X' represent, independently from each other, linear and/or branched alkylene or cycloalkylene radicals having 1 to 20 carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl;

$R^3$ represents a linear and/or branched alkylene or cycloalkylene radicals having 1 to 20 carbon atoms;

n, m being, independently from each other, 1 or n being 1 and m being 0; and a, b being, independently from each other 0 to 2;

b) at least one binder B being different from the silane-based compound of general formula (I); and c) at least one pigment P.

The above-specified coating composition is hereinafter also referred to as coating composition of the invention and accordingly is a subject of the present invention. Preferred embodiments of the coating composition of the invention are apparent from the description hereinafter and also from the dependent claims.

In light of the prior art it was surprising and unforeseeable for the skilled worker that the object on which the invention is based could be achieved by using a specific silane-based compound R as hardening additive in the aqueous basecoat composition. The use of said silane-based compound R results in an improved steam jet adhesion when the inventive basecoat compositions are combined with ambient curing clearcoat compositions while no improved steam jet adhesion was obtained when commercially available alkoxysilane compounds were used. Thus, the inventive basecoat compositions are especially suitable for OEM repair and refinish applications where low curing temperatures are used. Despite the addition of the silane-based compound R, the inventive basecoat compositions have a pot life of several hours, thus ensuring good application properties. Moreover, the addition of the silane-based compound R does not negatively influence the optical and coloristic properties of the basecoats and multilayer coatings prepared from said basecoat compositions.

A further subject of the present invention is a mixer kit for producing aqueous refinish compositions, comprising:

at least one first container (C1) comprising a tinting base containing at least one color and/or effect pigment and at least one binder, at least a second container (C2) comprising a pigment-free aqueous base varnish containing at least one binder;

at least a third container (C3) containing a silane-based composition comprising at least one silane-based compound R having an isocyanate content of less than 1% and obtained by reacting the free isocyanate groups of at least one aliphatic, cycloaliphatic, araliphatic and aromatic polyisocyanate with at least one silane compound of general formula (I)

$$HN[X{-}SiR^1_a(OR^2)_{3-a}]_n[X'{-}SiR^1_b(OR^2)_{3-b}]_m$$
$$[R^3]_{2-(m+n)}$$
(I)

wherein

X, X' represent, independently from each other, linear and/or branched alkylene or cycloalkylene radicals having 1 to 20 carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl;

$R^3$ represents a linear and/or branched alkylene or cycloalkylene radicals having 1 to 20 carbon atoms;

n, m being, independently from each other, 1 or n being 1 and m being 0; and a, b being, independently from each other 0 to 2;

and optionally at least one organic solvent; and optionally a fourth container (C4) comprising a pigment-free rheology module containing at least one inorganic and/or organic thickener.

Another subject of the present invention is a method for producing an aqueous coating composition from the inventive mixer kit, comprising mixing of at least one base color composition with a pigment-free aqueous composition, a silane-based compound composition and optionally a pigment-free rheology module.

Yet another subject of the present invention is a method for forming a multilayer coating (MC) on a substrate (S) comprising the following steps:

(1) applying an inventive aqueous coating composition or an aqueous coating composition prepared according to the inventive method on the substrate (S);

(2) forming a basecoat film from the coating composition applied in step (1);

(3) applying a clearcoat composition to a resulting basecoat film; and (4) jointly curing the basecoat film and the clearcoat film.

A final subject of the present invention is the use of a silane-based composition comprising at least one silane-based compound R having an isocyanate content of less than 1% and obtained by reacting the free isocyanate groups of at least one aliphatic, cycloaliphatic, araliphatic and aromatic polyisocyanate with at least one silane compound of general formula (I)

$$HN\left[X - SiR^1_a(OR^2)_{3-a}\right]_n\left[X' - SiR^1_b(OR^2)_{3-b}\right]_m[R^3]_{2-(m+n)}$$
(I)

wherein

X, X' represent, independently from each other, linear and/or branched alkylene or cycloalkylene radicals having 1 to 20 carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl;

$R^3$ represents a linear and/or branched alkylene or cycloalkylene radicals having 1 to 20 carbon atoms;

n, m being, independently from each other, 1 or n being 1 and m being 0; and a, b being, independently from each other 0 to 2;

and optionally at least one organic solvent as hardening additive in aqueous basecoat compositions, preferably aqueous refinish basecoat compositions.

DETAILED DESCRIPTION

The measurement methods to be employed in the context of the present invention for determining certain characteristic variables can be found in the Examples section. Unless explicitly indicated otherwise, these measurement methods are to be employed for determining the respective characteristic variable. Where reference is made in the context of the present invention to an official standard without any indication of the official period of validity, the reference is implicitly to that version of the standard that is valid on the filing date, or, in the absence of any valid version at that point in time, to the last valid version.

The term "poly(meth)acrylate" refers both to polyacrylates and to polymethacrylates. Poly(meth)acrylates may therefore be composed of acrylates and/or methacrylates and may comprise further ethylenically unsaturated monomers such as styrene or acrylic acid, for example.

The term "aliphatic" as used herein includes the term "cycloaliphatic" and refers to non-aromatic groups, moieties and compounds, respectively.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

All temperatures elucidated in the context of the present invention should be understood as the temperature of the room in which the substrate or the coated substrate is located. It does not mean, therefore, that the substrate itself is required to have the temperature in question.

Inventive Aqueous Coating Composition:

The expression "aqueous coating composition" is known to the skilled person. It refers to a system which comprises as its dispersion medium not exclusively or primarily organic solvents (also called solvents). In the context of the present invention, "aqueous" is to be understood as meaning that the coating composition has a proportion of at least 20% by weight, preferably at least 25% by weight, particularly preferably at least 50% by weight of water, in each case based on the total amount of solvents contained (i.e. water and organic solvents). Of these, the proportion of water is preferably 60 to 100% by weight, in particular 70 to 98% by weight, particularly preferably 75 to 95% by weight, in each case based on the total amount of the solvents present.

Silane-Based Compound R:

The inventive aqueous coating composition comprises as first mandatory component (a) at least one silane-based compound R having an isocyanate content (also called NCO content hereinafter) of less than 1%.

The silane-based compound R is obtained by reacting the free isocyanate groups of at least one aliphatic, cycloaliphatic, araliphatic and aromatic polyisocyanate with at least one specific silane compound. Said silane-based compound R preferably comprises an isocyanate content of less than 0.5%, more preferably of 0.05 to 0%, as determined according to DIN EN ISO 14896:2009-07. This ensures that the silane-based compound R does only comprise a rather low amount of free NCO groups or is essentially free of NCO groups, thus allowing to use this compound in isocyanate-free aqueous coating compositions.

The at least one polyisocyanate which is reacted with the specific silane compound preferably has an average isocyanate functionality of 2 to 6, more preferably of 2 to 5, very preferably of 2 to 3.5. This NCO functionality ensures that at least two alkoxysilane moieties which are necessary to achieve the improved steam jet adhesion if the inventive aqueous coating compositions are combined with low-curing clearcoat compositions are present in the silane-based compound R.

In principle, all aliphatic, cycloaliphatic, araliphatic and aromatic polyisocyanates are suitable within the present invention. Examples of polyisocyanates used preferably are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenyl diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Covestro AG), tetramethylxylyl diisocyanates (e.g., TMXDI® from American Cyanamid), and mixtures of the aforementioned polyisocyanates. Further-preferred polyisocyanates are the polyisocyanates derived from a polyisocyanate by trimerization, dimerization, urethanization, biuretization or allophanatization. Polyisocyanates used with particular preference are hexamethylenediisocyanate uretdione, hexamethylenediisocyanate, 1-isocyanato-4-[(4-isocyanatocyclohexyl)-methyl]-cyclohexane and hexamethylene diisocyanate trimer.

The at least one polyisocyanate is reacted with a silane compound of general formula (I)

$$HN\left[X - SiR_a^1(OR^2)_{3-a}\right]_n\left[X' - SiR_b^1(OR^2)_{3-b}\right]_m\left[R^3\right]_{2-(m+n)}. \qquad (I)$$

In this formula, X and X' preferably represent, independently from each other, a linear alkylene radical having 1 to 10, more preferably 1 to 6, even more preferably 2 to 5, very preferably 3, carbon atoms.

It is moreover preferred, if $R^2$ in formula (I) represent, independently from each other, a $C_1$-$C_{10}$ alkyl group, more preferably a $C_1$-$C_6$ alkyl group, very preferably a $C_1$ alkyl group.

$R^3$ in formula (I) preferably represents a linear $C_1$-$C_{10}$ alkyl group, more preferably a linear $C_1$-$C_6$ alkyl group, very preferably a linear $C_4$ alkyl group.

The silane compound R of general formula (I) comprises one or two alkoxysilane moieties. In case said compound comprises two alkoxysilane moieties, integers m and n in formula (I) are, independently from each other, 1. When only one alkoxysilane moiety is present in general formula (I), m is 1 and n is 0 or vice versa.

Preferred silane compounds R of general formula (I) comprise three alkoxy moieties. Therefore, a and b in formula (I) favorably are, independently from each other, 0.

Particularly preferred silane-based compounds R are prepared by reacting at least one silane compound of general formula (Ia) and/or (Ib)

$$HN\left[X - SiR_a^1(OR^2)_{3-a}\right]\left[X' - SiR_b^1(OR^2)_{3-b}\right] \qquad (Ia)$$

$$HN\left[X - SiR_a^1(OR^2)_{3-a}\right]_n\left[R^3\right]_{2-n} \qquad (Ib)$$

wherein

X, X' represent, independently from each other, a linear alkylene radical having 1 to 20, preferably 2 to 5, very preferably 3, carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, preferably a $C_{1-4}$ alkyl group, very preferably a methyl group;

$R^3$ represents a linear alkylene radical having 1 to 20, preferably 2 to 8, very preferably 4, carbon atoms;

a, b being, independently from each other 0 to 2, preferably 0; and n being 1;

with at least one polyisocyanate previously described.

If the silane-based compound R is prepared by reacting at least one silane compound of general formulae (Ia) and (Ib) with at least one polyisocyanate previously described, the weight ratio of the silane compound of general formula (Ia) to the silane compound of general formula (Ib) is preferably from 5:1 to 1:5, more preferably from 3:1 to 1:1, very preferably from 1.6:1.

The inventive aqueous coating composition preferably comprises the at least one silane-based compound R in a total amount of 1 to 20 wt.-%, more preferably 2 to 15 wt.-%, even more preferably 4 to 10 wt.-%, very preferably 6 to 9 wt.-%, based on the total weight of the coating composition. The use of said amounts results in an improved steam jet adhesion without negatively influencing the mechanical, optical and coloristic properties of coating layers produced from the inventive aqueous coating compositions.

Binder B:

The inventive aqueous coating composition comprises as second mandatory component (b) at least one binder B being different from the silane-based compound R. A "binder" in the context of the present invention and in accordance with DIN EN ISO 4618:2007-03 is the nonvolatile component of a coating composition, without pigments and fillers. Hereinafter, however, the expression is used principally in relation to particular physically curable polymers which optionally may also be thermally curable, examples being polyurethanes, polyesters, polyacrylates and/or copolymers of the stated polymers. A copolymer in the context of the present invention refers to polymer particles formed from different polymers. This explicitly includes both polymers bonded covalently to one another and those in which the different polymers are bound to one another by adhesion. Combinations of the two types of bonding are also covered by this definition.

In the context of the present invention, the term "physical curing" means the formation of a film through evaporation of solvents from polymer solutions or polymer dispersions. Typically, no crosslinking agents are necessary for this curing.

In the context of the present invention, the term "thermal curing" denotes the heat-initiated crosslinking of a coating film, using either self-crosslinking binders or a separate crosslinking agent in combination with a binder (external crosslinking). The crosslinking agent comprises reactive functional groups which are complementary to the reactive functional groups present in the binders so that a macroscopically crosslinked coating film is formed upon reaction of binders and crosslinker.

The binder components present in the inventive coating composition always exhibit at least a proportion of physical curing. If, therefore, it is said that the coating composition comprises binder components which are thermally curable, this of course does not rule out the curing also including a proportion of physical curing.

In principle, all water-dilutable or water dispersible binders are suitable, which are commonly used in aqueous coating compositions. The water dilutability or water dispersibility of the binders can be adjusted by using corresponding solubilizers as cosolvent or solvent.

Particularly preferred binders B are selected from the group consisting of (i) poly(meth)acrylates, more particularly hydroxy-functional and/or carboxylate-functional and/or amine-functional poly(meth)acrylates, (ii) polyurethanes, more particularly hydroxy-functional and/or carboxylate-functional and/or amine-functional polyurethanes, (iii) polyesters, more particularly polyester polyols, (iv) polyethers, more particularly polyether polyols, (v) copolymers of the stated polymers, and (vi) mixtures thereof, preferably polyurethanes.

Polyurethanes which are preferably used as binder B are commonly known in the state of the art. Suitable polyurethanes are for example described in DE 41 10 520 A1 and WO 2016/091539 A1. Said polyurethanes preferably have a number average molecular weight of 1,000 to 30,000 g/mol, more preferably 1,500 to 20,000 g/mol (determined by GPC using polystyrene as internal standard) and an acid number of 5 to 70 mg KOH/g solids, more preferably 10 to 30 mg KOH/g solids (determined according to DIN EN ISO 2114: 2002-06). These polyurethanes can be obtained, for example, by chain elongation of NCO-group containing prepolymers. These prepolymers can be prepared by reacting polyols with a hydroxyl number of 10 to 1,800 mg KOH/g solids (determined according to DIN 53240-2:2007-11) with an excess of polyisocyanates in an organic solvent. The NCO to OH equivalent ratio is preferably between 2:1 to 1:1, preferably 1.4:1 to 1.1:1.

Alternatively, the polyurethanes can be obtained by reacting NCO groups of the prepolymer with primary amino groups also present in said prepolymer. The primary amino groups can be introduced into the prepolymer by using an amino compound comprising at least one secondary and at least two blocked primary amino groups. After deblocking, the primary amino groups can react with the free NCO groups of the prepolymer to facilitate intermolecularly crosslinked polyurethane particles having a particle size of 40 to 2,000 nm and a gel content of at least 50%.

The polyols can have a low or high molecular weight and can comprise anionic groups. To increase the hardness of the polyurethane, low molecular weight polyols with a molecular weight Mw of 60 to 400 g/mol are used in an amount of up to 30% by weight of the total polyols. If an NCO prepolymer with high flexibility is desired, a high amount of linear polyols with a hydroxyl number of 30 to 150 mg KOH/g solids is preferably used. The polyol can comprise up to 97% by weight of saturated or unsaturated polyesters and/or polyethers with a number average molecular weight $M_n$ of 400 to 5,000 g/mol. It is preferred if the polyetherdiols do not contain a high amount of ether groups because this would lead to undesirable swelling of the resulting binders in aqueous environment. Polyesterdiols can be prepared by reacting organic dicarbonic acids or their anhydrides with organic polyols.

Typical multifunctional isocyanates are aliphatic, cycloaliphatic and/or aromatic polyisocyanates with at least two NCO groups per molecule. (Cyclo)aliphatic polyisocyanates are preferred because they have a high resistance against UV-light and thus result in decreased yellowing of the coating film. Preferred polyisocyanates are the polyisocyanates already listed with respect to the silane-based compound R.

In order to increase the water compatibility of the polyurethane resin, nonionic or ionic groups are incorporated into said polyurethanes, preferably by using NCO-terminated prepolymers comprising said nonionic or ionic groups. Neutralization of the ionic groups leads to stable dispersion of the polyurethane in water. Said groups can be incorporated by using compounds having at least two NCO reactive groups and at least one group capable of forming anions. Suitable NCO reactive groups are hydroxyl groups as well as primary and/or secondary amine groups, preferably hydroxyl groups. Suitable groups capable of forming anions are carboxyl, sulfonic acid and/or phosphonic acid groups, preferably carbonic acid or carboxyl groups.

The NCO prepolymer preferably comprises 0.5 to 15% by weight, based on the solids of the NCO prepolymer, of free NCO groups. Said free NCO groups are reacted with a chain extension agent, preferably a triol and/or polyol. It is also possible to use polyamines as chain extension agents.

The inventive aqueous coating composition preferably comprises the at least one binder B in a total amount of 1 to 20 wt.-% solids, more preferably 2 to 15 wt.-% solids, based on the total weight of the coating composition. The use of the afore-stated amounts of said binder leads to coating films having excellent mechanical stabilities.

Pigment P:

The inventive aqueous coating composition comprises as third mandatory component (c) at least one pigment P, preferably selected from organic and/or inorganic color pigments, effect pigments and mixtures thereof. Such color pigments and effect pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable, just like the terms "visual effect pigment" and "effect pigment".

Suitable inorganic coloring pigments are selected from (i) white pigments, such as titanium dioxide, zinc white, colored zinc oxide, zinc sulfide, lithopone; (ii) black pigments, such as iron oxide black, iron manganese black, spinel black, carbon black; (iii) color pigments, such as ultramarine green, ultramarine blue, manganese blue, ultramarine violet, manganese violet, iron oxide red, molybdate red, ultramarine red, iron oxide brown, mixed brown, spinel and corundum phases, iron oxide yellow, bismuth vanadate; (iv) filer pigments, such as silicon dioxide, quartz flour, aluminum oxide, aluminum hydroxide, natural mica, natural and precipitated chalk, barium sulphate and (vi) mixtures thereof.

Suitable organic coloring pigments are selected from (i) monoazo pigments such as C.I. Pigment Brown 25, C.I. Pigment Orange 5, 36 and 67, C.I. Pigment Orange 5, 36 and 67, C.I. Pigment Red 3, 48:2, 48:3, 48:4, 52:2, 63, 112 and 170 and C.I. Pigment Yellow 3, 74, 151 and 183; (ii) diazo pigments such as C.I. Pigment Red 144, 166, 214 and 242, C.I. Pigment Red 144, 166, 214 and 242 and C.I. Pigment Yellow 83; (iii) anthraquinone pigments such as C.I. Pigment Yellow 147 and 177 and C.I. Pigment Violet 31; (iv) benzimidazole pigments such as C.I. Pigment Orange 64; (v) quinacridone pigments such as C.I. Pigment Orange 48 and 49, C.I. Pigment Red 122, 202 and 206 and C.I. Pigment Violet 19; (vi) quinophthalone pigments such as C.I. Pigment Yellow 138; (vii) diketopyrrolopyrrole pigments such as C.I. Pigment Orange 71 and 73 and C.I. Pigment Red, 254, 255, 264 and 270; (viii) dioxazine pigments such as C.I. Pigment Violet 23 and 37; (ix) indanthrone pigments such as C.I. Pigment Blue 60; (x) isoindoline pigments such as C.I. Pigment Yellow 139 and 185; (xi) isoindolinone pigments such as C.I. Pigment Orange 61 and C.I. Pigment Yellow 109 and 110; (xii) metal complex pigments such as C.I. Pigment Yellow 153; (xiii) perinone pigments such as C.I. Pigment Orange 43; (xiv) perylene pigments such as C.I. Pigment Black 32, C.I. Pigment Red 149, 178 and 179 and C.I. Pigment Violet 29; (xv) phthalocyanine pigments such as C.I. Pigment Violet 29, C.I. Pigment Blue 15, 15:1, 15:2, 15:3, 15:4, 15:6 and 16 and C.I. Pigment Green 7 and 36; (xvi) aniline black such as C.I. Pigment Black 1; (xvii) azomethine pigments; and (xviii) mixtures thereof.

Suitable effect pigments are selected from the group consisting of (i) plate-like metallic effect pigments such as plate-like aluminum pigments, gold bronzes, fire-colored bronzes, iron oxide-aluminum pigments; (ii) pearlescent pigments, such as metal oxide mica pigments; (iii) plate-like graphite pigments; (iv) plate-like iron oxide pigments; (v) multi-layer effect pigments from PVD films; (vi) liquid crystal polymer pigments; and (vii) mixtures thereof.

The aqueous coating composition preferably comprises the at least one pigment P in a total amount of 1 to 40 wt.-%, preferably 2 to 20 wt.-%, based on the total weight of the aqueous coating composition.

Further Additives:

Particularly preferred inventive aqueous coating compositions are low curing aqueous coating compositions which comprise a total amount of less than 2 wt.-%, preferably 0 wt.-%, based on the total weight of the coating composition, of at least one crosslinking agent, preferably selected from amino resins, polyisocyanates, blocked polyisocyanates, polycarbodiimides, photoinitiators, and mixtures thereof. Particularly preferred inventive coating compositions are therefore free from commonly known crosslinking agents which are subject to environmental regulations because they are toxic or generate toxic compounds upon curing of the coating composition.

The inventive aqueous coating composition can further comprise at least one coating additive customary used in aqueous coating compositions. Said additive can be selected from the group consisting of are (i) UV absorbers; (ii) light stabilizers such as HALS compounds, benzotriazoles or oxalanilides; (iii) rheology modifiers such as sagging control agents (urea crystal modified resins), organic thickeners and inorganic thickeners; (iv) free-radical scavengers; (v) slip additives; (vi) polymerization inhibitors; (vii) defoamers; (viii) wetting agents; (ix) fluorine compounds; (x) adhesion promoters; (xi) leveling agents; (xii) film-forming auxiliaries such as cellulose derivatives; (xiii) fillers, such as nanoparticles based on silica, alumina or zirconium oxide; (xiv) flame retardants; and (xv) mixtures thereof.

These additives can be used in customary amounts, typically in the range of 0.1 to 30% by weight, based on the total weight of the coating composition.

Inventive Mixer Kit and Process to Produce Aqueous Basecoat from Said Mixer Kit:

Mixer kits for the production of coating compositions are widespread particularly in the automotive refinishing sector since the multiplicity of properties to be set, such as hues, for example, make it difficult to supply and hold in stock corresponding fully formulated coating compositions. The use of a mixer kit where components of said kit can be mixed individually with one another according to the requirement of the coating composition has therefore become established. The mixer kits customarily comprise different base components. These base components customarily include one or more pigmented tinting bases, at least one base varnish and optionally at least one rheology module for setting the rheological properties of the coating composition produced from the mixer kit. As the skilled person is aware, mixer kits in the automotive refinishing sector are different from conventional formulas of the kind used, for example, for producing basecoat materials for OEM finishing.

The tinting bases, in addition to at least one physically curing and/or one self-crosslinking and/or one externally crosslinking binder, customarily comprise at least one color-imparting and/or optical-effect-imparting pigment.

The base varnish is customarily a pigment-free composition comprising at least one physically curing and/or one self-crosslinking and/or one externally crosslinking binder. In the case of an externally crosslinking binder, the admixing of a crosslinker, where appropriate, is necessary for the curing of the coating composition. By mixing different tinting bases with the base varnish, coating compositions with any of a very wide variety of properties can be produced. These properties include, among others, different hues and/or differently accentuated optical effects, such as the color flop or the metallic flop of a coating, for example.

For setting the rheological properties of the coating composition resulting from the mixer kit, it is customary to use a rheology control composition which comprises at least one inorganic and/or organic thickener.

The inventive mixer kit comprises at least one tinting base containing at least one color and/or effect pigment and at least one binder, at least one pigment-free aqueous base varnish containing at least one binder and optionally at least one pigment-free rheology module. The system additionally comprises at least one silane-based composition containing the silane-based compound R previously described in connection with the inventive aqueous coating composition and optionally at least one organic solvent. Said silane-based composition can be used to increase the steam jet adhesion if the inventive aqueous coating composition is combined with low-curing clearcoat compositions.

The tinting base can be an aqueous or a solvent-based composition. Aqueous tinting bases generally have a water content of at least 5% by weight-based on the total weight of the tinting base—and are favorable if the coating composition obtained from the mixing system should have a VOC content of less than 250 g/I. In contrast, solvent-based tinting bases generally contain less than 5% by weight-based on the total weight of the tinting base—and lead to coating compositions having higher VOC contents. With respect to the pigments and binder contained in the solvent-based tinting base, reference is made to the pigments and binders described in connection with the inventive aqueous coating composition. Suitable binders and pigments for aqueous tinting bases are described in unpublished EP 19189323.

The pigment free-base varnish preferably comprises the same binder as the tinting base in order to mitigate incompatibilities during preparation of the coating formulation. With respect to suitable binders for the pigment-free base varnish, reference is made to the binders discussed in connection with the inventive aqueous coating composition or which are described in unpublished EP 19189323. The pigment-free base varnish can further comprise at least one rheology additive, for example crosslinked polymeric microparticles, inorganic sheet silicates or synthetic polymers with ionic or associative groups or mixtures thereof. Preferred thickeners are inorganic sheet silicates and polyacrylate copolymers containing carboxyl groups.

The silane-based composition comprises the silane-based compound R previously described in connection with the inventive coating composition and optionally at least one organic solvent. The organic solvent is preferably selected from aliphatic and/or aromatic hydrocarbons, such as toluene, xylene, solvent naphtha, Solvesso 100 or Hydrosol® (from APAL), ketones, such as acetone, methyl ethyl ketone or methyl amyl ketone, esters, such as ethyl acetate, butyl acetate, pentyl acetate or ethyl ethoxypropionate, ethers, or mixtures of the afore-mentioned solvents. Butyl acetated is used with preference as organic solvent.

What has been said about the inventive coating composition applies mutatis mutandis with respect to further preferred embodiments of the components of the inventive mixer kit.

The aqueous coating composition can be prepared from the inventive mixer kit by mixing at least one tinting base with a pigment-free base varnish and the silane-based composition. If necessary, the viscosity of the formulation can be adjusted by using a pigment-free rheology module. The preparation of the inventive coating composition by mixing several components allows to prepare the required color tone on demand, thus reducing the need to store different colors in separate containers.

What has been said about the inventive coating composition and the inventive mixer kit applies mutatis mutandis with respect to further preferred embodiments of the inventive method to prepare an aqueous coating composition from the mixer kit.

Inventive Process to Prepare a Multilayer Coating (MC) on a Substrate (S):

The inventive method for forming a multilayer coating (MC) on a substrate (S) comprises the following steps:

(1) applying an inventive aqueous coating composition or an aqueous coating composition prepared according to the inventive method on the substrate (S);

(2) forming a basecoat film from the coating composition applied in step (1);

(3) applying a clearcoat composition to a resulting basecoat film; and (4) jointly curing the basecoat film and the clearcoat film.

According to a first alternative, the substrate (S) is preferably selected from metallic substrates, metallic substrates coated with a cured electrocoat and/or a cured filler, plastic substrates and substrates comprising metallic and plastic components, especially preferably from metallic substrates. In case of metallic and plastic substrates or substrates comprising metallic and plastic components, said substrates may be pretreated before step (1) of the inventive process in any conventional way—that is, for example, cleaned (for example mechanically and/or chemically) and/or provided with known conversion coatings (for example by phosphating and/or chromating) or surface activating pre-treatments (for example by flame treatment, plasma treatment and corona discharge coming).

In this respect, preferred metallic substrates (S) are selected from iron, aluminum, copper, zinc, magnesium and alloys thereof as well as steel. Preferred substrates are those of iron and steel, examples being typical iron and steel substrates as used in the automobile industry sector. The substrates themselves may be of whatever shape—that is, they may be, for example, simple metal panels or else complex components such as, in particular, automobile bodies and parts thereof.

Preferred plastic substrates (S) are basically substrates comprising or consisting of (i) polar plastics, such as polycarbonate, polyamide, polystyrene, styrene copolymers, polyesters, polyphenylene oxides and blends of these plastics, (ii) synthetic resins such as polyurethane RIM, SMC, BMC and (iii) polyolefin substrates of the polyethylene and polypropylene type with a high rubber content, such as PP-EPDM, and surface-activated polyolefin substrates. The plastics may furthermore be fiber-reinforced, in particular using carbon fibers and/or metal fibers.

As substrates (S) it is also possible, moreover, to use those which contain both metallic and plastics fractions. Substrates of this kind are, for example, vehicle bodies containing plastics parts.

Metallic substrates comprising a cured electrocoating can be obtained by electrophoretically applying an electrocoat material on the metallic substrate (S) and curing said applied material at a temperature of 100 to 250° C., preferably 140 to 220° C. for a period of 5 to 60 minutes, preferably 10 to 45 minutes. Before curing, said material can be flashed off, for example, at 15 to 35° C. for a period of, for example, 0.5 to 30 minutes and/or intermediately dried at a temperature of preferably 40 to 90° C. for a period of, for example, 1 to 60 minutes. Suitable electrocoat materials and also their curing are described in WO 2017/088988 A1, and comprise hydroxy-functional polyether amines as binder and blocked polyisocyanates as crosslinking agent. Before application of the electrocoating material, a conversion coating, such as a zinc phosphate coat, can be applied to the metallic substrate. The film thickness of the cured electrocoat is, for example, 10 to 40 micrometers, preferably 15 to 25 micrometers.

Metallic substrates comprising a cured electrocoating and/or a cured filler can be obtained by applying a filler composition to a metallic substrate (S) optionally comprising a cured electrocoating or to a metallic and/or plastic substrate (S) and curing said filler composition at a temperature of 40 to 100° C., preferably 60 to 80° C. for a period of 5 to 60 minutes, preferably 3 to 8 minutes. Suitable filler compositions are well known to the person skilled in the art and are, for example, commercially available under the brand name Glasurit from BASF Coatings GmbH. The film thickness of the cured filler is, for example, 30 to 100 micrometers, preferably 50 to 70 micrometers.

According to a second alternative, the substrate in step (1) is a multilayer coating possessing defect sites. This substrate which possesses defect sites is therefore an original finish (i.e. multilayer coating), which is to be repaired or completely recoated. The above-described defect sites in the multilayer coating can be repaired means of the above-described process the invention. For this purpose, the surface to be repaired in the multilayer coating may initially be abraded. The abrading is preferably performed by partially sanding, or sanding off, either the basecoat and the clearcoat layer or all coating layers. Abrading only the basecoat and the clearcoat layer has become established especially in the OEM automotive refinishing segment, since here, in contrast to refinishing in a workshop, generally speaking, defects occur only in the basecoat and/or clearcoat region, but do not, in particular, occur in the region of the underlying filler layer. If defects are also encountered in the filler layer, for example scratches which are produced, for example, by mechanical effects and which often extend down to the substrate surface (metallic or plastic substrate), abrading of all coating layers present on the substrate is necessary.

Step (1):

In step (1) of the inventive method, the inventive aqueous coating composition or the aqueous coating composition prepared from the inventive method by using the mixer system is applied on the substrate (S). The application of said coating composition to the substrate (S) is understood as follows. The aqueous coating material in question is applied such that the coating film produced in step (2) is disposed on the substrate, but need not necessarily be in direct contact with the substrate. For example, between the coating film and the substrate, there may be other coats disposed. Preferably, the aqueous coating composition is applied directly to the substrate (S) in step (1), meaning that the coating film produced in step (2) is in direct contact with the substrate (S).

The inventive aqueous coating composition may be applied by the methods known to the skilled person for applying liquid coating materials, as for example by dipping, knifecoating, spraying, rolling, or the like. Preference is given to employing spray application methods, such as, for example, compressed air spraying (pneumatic application), airless spraying, high-speed rotation, electrostatic spray application (ESTA), optionally in conjunction with hot spray application such as hot air (hot spraying), for example. With very particular preference the aqueous coating composition is applied via pneumatic spray application or electrostatic spray application.

Step (2):

In step (2) of the inventive method, a basecoat film is formed from the aqueous coating composition applied in step (1). The formation of a film from the applied coating composition can be effected, for example, by flashing off the applied coating composition. The term "flashing off" is understood in principle as a designation for the passive or active evaporation of organic solvents and/or water from the aqueous coating composition, usually at ambient temperature (that is, room temperature). Since the coating material is still fluid directly after application and at the beginning of flashing, it may undergo flow to form a homogeneous, smooth coating film. Thus, after the flashing phase, a comparatively smooth coating film, which comprises less water and/or solvent in comparison with the applied coating material is obtained. While it is no longer flowable it is, for example, still soft. In particular, the coating film is not yet cured as described later on below.

The formation of the basecoat film in step (2) is performed at a temperature of 20 to 60° C. for a duration of 5 to 80 minutes, preferably performed at a temperature of 20 to 35° C. for a duration of 5 minutes to 70 minutes.

Step (3):

In step (3) of the inventive method, a clearcoat composition is applied on the basecoat film formed in step (2). The clearcoat composition is preferably applied directly to the formed basecoat film, i.e. no further coating layers are present between the basecoat film formed in step (2) and the clearcoat composition applied in step (3).

Since the inventive method is especially suitable for substrates covered with a multilayer coating having defect sites, a low-curing solvent-based clearcoat composition is preferably used in step (3) of the inventive method. With particular preference, the clearcoat composition comprises (a) at least one silane-based compound R2 having an isocyanate content of less than 1% and comprising at least one silane group of general formula (II)

$$* - NR^1 X - SiR_a^2 (OR^3)_{3-a} \qquad \text{(II)}$$

and optionally at least one silane group of general formula (III)

$$* - N[X - SiR_a^2(OR^3)_{3-a}]_n[X' - SiR_b^2(OR^3)_{3-b}]_m \qquad \text{(III)}$$

wherein

X, X' are, independently from each other, linear and/or branched alkylene or cycloalkylene radicals having 1 to 20 carbon atoms;

$R^1$ is an alkyl group containing 1 to 10 carbon atoms, $R^2$, $R^3$ are, independently from each other, alkyl, cycloalkyl, aryl, or aralkyl groups, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl, n, m being, independently from each other, 0 to 2, with the proviso that m+n=2, a, b being, independently from each other, 0 to 2;

(b) at least one catalyst C1 of general formula (III)

$$z\left[C(R^4)(R^5)(R^6) - (CH_2)_n - C(=O) - O^-\right]M^{z+} \qquad (IV)$$

wherein $R^4$ to $R^6$ are, independently from each other, hydrogen or alkyl groups containing 1 to 6 carbon atoms, with the proviso that the sum of the number of carbon atoms in residues $R^4$ to $R^6$ ranges from 3 to 8;

z being 1 to 4; and n being 0 or 1 to 8 with the proviso that, if z=1, then M is selected from the group consisting of Li, K and Na;

if z=2, then M is selected from the group consisting of Zn and Zr;

if z=3, then M is selected from the group consisting of Bi and Al;

if z=4, then M is selected from the group consisting of Zr and Ti; and (c) one or more aprotic organic solvents.

The term "silane-based compound" refers to compounds comprising at least one silane group of formula (II) and optionally (III) described above. Said silane-group is attached via the * symbol to a skeleton of the compound preferably through an urea linkage. As used herein, the "skeleton" of the compound is the portion of the compound other than structure (II) and optionally (III). When a suitable skeleton of the compound is a polymer, the silane groups (II) and optionally (III) may be pendent from the polymer chain, or they may be incorporated into the polymer chain, or a combination thereof.

The silane-based compound R2 preferably comprises an isocyanate content of less than 0.5%, more preferably of 0.05 to 0%. This ensures that the silane-based compound R2 does only comprise a rather low amount of free NCO groups or is essentially free of NCO groups, thus allowing to use this compound in isocyanate-free coating compositions.

The reactivity of organofunctional silanes can be influenced considerably by the length of the spacers X, X' between silane functionality and organic functional group serving for reaction with the backbone of the silane-based compound R2. X and X' in general formula (II) and (III) preferably represent, independently from each other, a linear alkylene radical having 1 to 10, more preferably 1 to 6, even more preferably 2 to 5, very preferably 3, carbon atoms.

$R^1$ in general formula (II) is preferably an alkyl group containing 2 to 8 carbon atoms, more preferably 4 to 6 carbon atoms, very preferably 4 carbon atoms.

The respective preferred alkoxy radicals ($OR^3$) influence the reactivity of the hydrolyzable silane groups. Particularly preferred are radicals $R^3$ which raise the reactivity of the silane groups, i.e., which constitute good leaving groups. Thus a methoxy radical is preferred over an ethoxy radical, which is preferred in turn over a propoxy radical. With particular preference, therefore, $R^3$ in formula (I) and (II) represent, independently from each other, a $C_1$-$C_{10}$ alkyl group, more preferably a $C_1$-$C_6$ alkyl group, very preferably a $C_1$ alkyl group.

The silane group of general formula (III) comprises two alkoxysilane moieties, thus the sum of n and m is 2. The respective alkoxysilane moieties can be the same or can differ from each other. In case of different alkoxysilane moieties, $R^3$ and $R^4$ are different if m=n=1. In case of the same alkoxysilane moieties, either $R^3$ and $R^4$ are the same and m=n=1 or m=0 and n=2 or vice versa.

Preferred silane groups of general formula (II) and, if present, silane groups of formula (III), each comprise three alkoxy moieties. Therefore, a in formula (II) and (III) and b in formula (III) favorably are, independently from each other, 0.

The silane-based compounds R2 (a) can be prepared by reacting at least one polyisocyanate with at least one compound of general formula (IIa)

$$HNR^1 - X - SiR_a^2(OR^3)_{3-a} \qquad (IIa)$$

and optionally with at least one compound of general formula (IIIa)

$$HN\left[X - SiR_a^2(OR^3)_{3-a}\right]_n\left[X' - SiR_b^2(OR^3)_{3-b}\right]_m \qquad (IIIa)$$

$R^1$ to $R^3$, X, X', a, b, m and n in general formulas (IIa) and (IIIa) are as previously defined.

Suitable polyisocyanates and compounds of formulae (IIa) and (IIIa) are the ones previously described in connection with the silane-based compound R.

It is preferred according to the invention if the silane-based compound R2 contains 50 to 100 mol %, preferably 80 to 100 mol %, more preferably 95 to 100 mol %, of at least one silane group of general formula (I) and 0 to 50 mol %, preferably 0 to 20 mol %, more preferably 0 to 5 mol %, of at least one silane group of general formula (II), based in each case on the entirety of the silane groups of general formulae (I) and (II). It has been found that in particular the ratio of silane groups of general formula (I) to the silane groups of general formula (II) has a quite critical influence on the occurrence of cracks in the resultant coating. In this relationship, generally speaking, the occurrence of cracks in the resultant coatings increases with decreasing fraction of monosilane groups of general formula (I) and with increasing fraction of bissilane groups of general formula (II). Thus, particularly preferred silane-based compound R2 contain 100 mol-% of silane groups of general formula (I) and 0 mol-% of silane groups of general formula (II).

Very surprising, and also highly advantageous, is the fact that, simultaneously with the decrease of the occurrence of cracks through an increasing fraction of monosilane groups of general formula (I) and a decreasing fraction of bissilane groups of general formula (II), there is only a very slight deterioration in the scratch resistance of the resultant coating.

The silane-based compound R2 is preferably present in a total amount of 25 to 95 wt.-%, more preferred 35 to 90 wt.-% and most preferred from 40 to 80 wt.-%, based in each case on the total weight of the clear coating composition. This amount of silane-based compound R2, which is employed in the coating composition, is the calculated theoretical amount of the silane-based compound R2 based on the proviso that the sum of the weights of reactants employed in the production of silane-based compound R2 equals the final weight of the silane-based compound R2.

It is preferred that the silane-based compound R2 (a) and the at least one catalyst C1 (b) as described below are combined just before use of the clearcoat composition to avoid pre-mature crosslinking, however, a storage stable one-component composition can also be realized if water traces are excluded from the composition till application.

The at least one catalyst C1 (b) has the general formula (IV) above. Preferably the sum of the number of carbon atoms in residues $R^c$ and $R^d$ ranges from 3 to 5 or from 5 to 7 and z=1, 3 or 4, most preferred 1 or 4. n in general formula (IV) is preferably 0 or 2 to 6, preferably 0 or 4. If n is 0, residues $R^4$ and $R^5$ in general formula (IV) are, independently from each other, linear or branched $C_3$-$C_5$ alkyl groups and residue $R^6$ is a methyl group, with the proviso that the sum of all carbon atoms of residues $R^4$ to $R^6$ is 8. If n in general formula (IV) is 1 to 8, preferably 4, residues $R^4$ to $R^6$ are, independently from each other, methyl groups.

M in general formula (III) is preferably potassium, lithium or titanium, preferably potassium or titanium.

Thus, the most preferred catalysts C1 (b) of general formula (IV) are neodecanoates and 2-ethylhexanoates of potassium, lithium or titanium, preferably potassium (I) neodecanoate, potassium (I) 2-ethylhexanoate, titanium (IV) neodecanoate or titanium (IV) 2-ethylhexanoate. The catalyst C1 (b) of general formula (IV) is often supplied in an acid stabilized form containing the same branched free carboxylic acid which corresponds to the catalyst of general formula (IV). The presence of said free acid has proven to be beneficial in combination with the further catalyst described hereinafter.

The amount of catalyst C1 (b) of general formula (IV), based on the amount of compound R2 (a) of the clearcoat composition, preferably ranges from 1 mmol to 50 mmol, more preferred from 5 mmol to 40 mmol and most preferred from 15 to 25 mmol metal per 100 g silane-based compound R2 (a) solid.

Preferably the clearcoat composition further contains a second catalyst C2 selected from the group of bicyclic tertiary amines and metal alkoxides, very preferably metal alkoxides. Most preferred bicyclic tertiary amines are 1,5-diaza-bicyclo[4.3.0]non-5-ene (hereinafter referred to as DBN), 1,5-diaza-bicyclo(4,4,0)decene-5 (hereinafter referred to as DBD) or 1,8-diaza-bicyclo[5.4.0]undec-7-ene (herein referred to as DBU) and 1,4-diazabicyclo[2.2.2] octane (herein referred to as DABCO). Among them, DBU and DBN are preferred. Particularly preferred is DBU. Such bicyclic tertiary amines may be used alone, or two or more of them may be used in combination. Particularly preferred metal alkoxides are selected from titanium (V) alkoxides. Said titanium (V) alkoxides have the general formula (V)

$$M^1[(OR^7)_m(R^8)_{n-m}]_n \quad (V)$$

with $R^7$ being a linear or branched $C_1$ to $C_{10}$ alkyl group and $R^8$ being a halogen group, an acetylacetonate group, an alkyl acetoacetate group or an ethanolaminato group, $M^1$ represents at least one metal selected from silicon, titanium, tantalum, zirconium, boron, aluminum, magnesium or zinc, m being an integer from 0 to 4, and n represents a valence of 2 to 5 of $M^1$.

Particularly preferred metal alkoxides are titanium (IV) alkoxides are selected from titanium (IV) alkoxides of general formula (V) wherein $R^7$ is a $C_3$ to $C_5$ group, $R^8$ in a ethyl acetoacetate group, $M^1$ is titanium and n represents a valence of 4. Especially preferred titanium (IV) alkoxides are titanium (IV) isopropoxide and/or titanium (IV) n-butoxide and/or titanium (IV) bis(ethylacetoacetate)diisopropoxide.

The combination of catalyst C1 (b) of general formula (IV) with the second catalyst C2 results in improved adhesion and moisture resistance compared to the sole use of catalyst C1 (b) of general formula (IV). The weight ratio of catalyst C1 (b) of general formula (IV) to the at least one second catalyst C2, preferably titanium (IV) isopropoxide and/or titanium (IV) n-butoxide and/or titanium (IV) bis (ethylacetoacetate)diisopropoxide, is preferably from 1:2 to 8:1, more preferred from 1:1 to 4:1 and most preferred from 1:1 to 3:1 such as 1.5:1.

The clearcoat compositions contain one or more aprotic solvents. The aprotic solvents in the clearcoat composition are chemically inert toward silane-based compound R2 (a), i.e. they do not react with silane-based compound R2 (a) when the clearcoat composition is cured. Examples of such solvents are aliphatic and/or aromatic hydrocarbons, such as toluene, xylene, solvent naphtha, Solvesso 100 or Hydrosol® (from APAL), ketones, such as acetone, methyl ethyl ketone or methyl amyl ketone, esters, such as ethyl acetate, butyl acetate, pentyl acetate or ethyl ethoxypropionate, ethers, or mixtures of the afore-mentioned solvents. The aprotic solvents or solvent mixtures preferably have a water content of not more than 1% by weight, more preferably not more than 0.5% by weight, based on the solvent.

The clearcoat compositions are preferably substantially water-free and free from protic organic solvents (less than 10 wt.-%, preferably less than 5 wt.-% of water and/or protic organic solvents, based on the total weight of the clearcoat composition).

The clearcoat compositions can further comprise at least one epoxy compound. Suitable epoxy compounds are, for example, aliphatic glycidyl ethers and aliphatic glycidyl esters (the terms include cycloaliphatic glycidyl ethers and cycloaliphatic glycidyl esters). Said epoxy compounds can optionally comprise alkoxysilane groups. The amount of the epoxy compound, based on the solids content of the clearcoat composition, is preferably from 0 to 20 wt.-%, more preferred 2.5 to 15 wt.-% and most preferred from 5 to 10 wt.-%. Said epoxy compound is preferably combined with the silane-based compound R2 (a) and then mixed with the at least one catalyst C1 (b) and optionally C2 prior to application.

The clearcoat composition can also comprise customary known additives, such as previously described in connection with the inventive aqueous coating composition.

Step (4):

In step (4) of the inventive method, the basecoat film and the clearcoat composition are jointly cured. The curing of a coating film or composition is understood accordingly to be the conversion of such a film or composition into the service-ready state, in other words into a state in which the substrate furnished with the coating film in question can be transported, stored, and used in its intended manner. A cured coating film, then, is in particular no longer soft, but instead is conditioned as a solid coating film which, even on further exposure to curing conditions as described later on below, no longer exhibits any substantial change in its properties such as hardness or adhesion to the substrate.

In principle the curing is carried out at temperatures of 15 to 160° C., for example, in particular 40 to 90° C., for a duration of 5 to 80 minutes, preferably 10 to 50 minutes. Since the inventive method is especially suitable for refinish applications in which low-curing conditions are necessary, the joint curing in step (4) is preferably performed at a temperature of 20 to 30° C. for a duration of 10 to 70 minutes, more preferably 20 to 60 minutes.

The combination of the inventive aqueous coating composition as basecoat composition and an isocyanate-free clearcoat composition allows to prepare multilayer coatings without the use of isocyanate containing coating compositions. Even though no isocyanate hardener is contained in the basecoat composition, an excellent steam jet adhesion is obtained without negatively influencing the mechanical and optical properties of the resulting multilayer coating. Since the inventive coating composition can be cured a low-temperatures, the inventive process is especially suitable for refinish applications and is highly economical due to the use of low curing temperatures and isocyanate-free coating compositions.

What has been said about the inventive coating composition, the inventive mixer system and the method to prepare an inventive coating composition from a mixer system applies mutatis mutandis with respect to further preferred embodiments of the inventive method to prepare a multilayer coating.

Inventive Multilayer Coating (MC):

The result after the end of step (4) of the method of the invention is a multilayer coating (MC) of the invention.

Inventive Use:

A final subject-matter of the present invention is the use of a specific silane-based compound R as hardening additive in aqueous basecoat compositions, preferably aqueous refinish basecoat compositions. The silane-based compound R is corresponding to component (a) of the inventive coating composition and was already described in detail hereinbefore.

Use of said specific silane-based compound R in aqueous basecoat compositions leads to improved steam jet adhesion, especially if these aqueous basecoat compositions are combined with low-curing clearcoat compositions in refinish applications. This renders the additional use of isocyanate hardeners in the basecoat composition superfluous, thus allowing to formulate isocyanate-free low-curing basecoat compositions having excellent adhesion properties.

What has been said about the inventive coating composition, especially about the silane-based compound R, applies mutatis mutandis with respect to further preferred embodiments of the inventive use.

The invention is described in particular by the following embodiments:

Embodiment 1: aqueous coating composition comprising:
a) at least one silane-based compound R having an isocyanate content of less than 1% obtained by reacting the free isocyanate groups of at least one aliphatic, cycloaliphatic, araliphatic and aromatic polyisocyanate with at least one silane compound of general formula (I)

$$HN\left[X - SiR_a^1(OR^2)_{3-a}\right]_n\left[X' - SiR_b^1(OR^2)_{3-b}\right]_m\left[R^3\right]_{2-(m+n)} \quad (I)$$

wherein

X, X' represent, independently from each other, linear and/or branched alkylene or cycloalkylene radicals having 1 to 20 carbon atoms;
represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl;

$R^3$ represents a linear and/or branched alkylene or cycloalkylene radicals having 1 to 20 carbon atoms;

n, m being, independently from each other, 1 or n being 1 and m being 0; and a, b being, independently from each other 0 to 2; and b) at least one binder B being different from the silane-based compound of general formula (I); and c) at least one pigment P.

Embodiment 2: aqueous coating composition according to embodiment 1, characterized in that the silane-based compound R has an isocyanate content of less than 0.5%, preferably of 0.05 to 0%, as determined according to DIN EN ISO 14896:2009-07.

Embodiment 3: aqueous coating composition according to embodiment 1 or 2, characterized in that the at least one polyisocyanate has an average isocyanate functionality of 2 to 6, preferably of 2 to 5, very preferably of 2 to 3.5.

Embodiment 4: aqueous coating composition according to any of the preceding embodiments, characterized in that the polyisocyanate is selected from hexamethylenediisocyanate uretdione, hexamethylenediisocyanate, 1-Isocyanato-4-[(4-isocyanatocyclohexyl)methyl]-cyclohexane and hexamethylene diisocyanate trimer.

Embodiment 5: aqueous coating composition according to any of the preceding embodiments, characterized in that X and X' in formula (I) represent, independently from each other, a linear alkylene radical having 1 to 10, preferably 1 to 6, more preferably 2 to 5, very preferably 3, carbon atoms.

Embodiment 6: aqueous coating composition according to any of the preceding embodiments, characterized in that $R^2$ in formula (I) represent, independently from each other, a $C_1$-$C_{10}$ alkyl group, preferably a $C_1$-$C_6$ alkyl group, very preferably a $C_1$ alkyl group.

Embodiment 7: aqueous coating composition according to any of the preceding embodiments, characterized in that $R^3$ in formula (I) represents a linear $C_1$-$C_{10}$ alkyl group, preferably a linear $C_1$-$C_6$ alkyl group, very preferably a linear $C_4$ alkyl group.

Embodiment 8: aqueous coating composition according to any of the preceding embodiments, characterized in that a and b in formula (I) are, independently from each other, 0.

Embodiment 9: aqueous coating composition according to any of the preceding embodiments, characterized in that at least one silane compound of general formula (Ia) and/or (Ib)

$$HN\left[X - SiR_a^1(OR^2)_{3-a}\right]\left[X' - SiR_b^1(OR^2)_{3-b}\right] \quad (Ia)$$

$$HN\left[X - SiR_a^1(OR^2)_{3-a}\right]_n\left[R^3\right]_{2-n} \quad (Ib)$$

wherein

X, X' represent, independently from each other, a linear alkylene radical having 1 to 20, preferably 2 to 5, very preferably 3, carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, preferably a $C_{1-4}$ alkyl group, very preferably a methyl group;

$R^3$ represents a linear alkylene radical having 1 to 20, preferably 2 to 8, very preferably 4, carbon atoms;

a, b being, independently from each other 0 to 2, preferably 0; and n being 1;

is reacted with the at least one polyisocyanate.

Embodiment 10: aqueous coating composition according to embodiment 10, characterized that the weight ratio of the silane compound of general formula (Ia) to the silane compound of general formula (Ib) is 5:1 to 1:5, preferably 3:1 to 1:1, very preferably 1.6:1.

Embodiment 11: aqueous coating composition according to any of the preceding embodiments, characterized that the at least one silane-based compound R is present in a total amount of 1 to 20 wt.-%, preferably 2 to 15 wt.-%, more preferably 4 to 10 wt.-%, very preferably 6 to 9 wt.-%, based on the total weight of the coating composition.

Embodiment 12: aqueous coating composition according to any of the preceding embodiments, characterized that the binder B is selected from the group consisting of (i) poly (meth)acrylates, more particularly hydroxy-functional and/or carboxylate-functional and/or amine-functional poly (meth)acrylates, (ii) polyurethanes, more particularly hydroxy-functional and/or carboxylate-functional and/or amine-functional polyurethanes, (iii) polyesters, more particularly polyester polyols, (iv) polyethers, more particularly polyether polyols, (v) copolymers of the stated polymers, and (vi) mixtures thereof, preferably polyurethanes.

Embodiment 13: aqueous coating composition according to any of the preceding embodiments, characterized that the at least one binder B is present in a total amount of 1 to 20 wt.-% solids, preferably 2 to 15 wt.-% solids, based on the total weight of the coating composition.

Embodiment 14: aqueous coating composition according to any of the preceding embodiments, characterized that the at least one pigment P is selected from organic coloring pigments, inorganic coloring pigments and effect pigments.

Embodiment 15: aqueous coating composition according to embodiment 14, characterized that the inorganic coloring pigment is selected from (i) white pigments, such as titanium dioxide, zinc white, colored zinc oxide, zinc sulfide, lithopone; (ii) black pigments, such as iron oxide black, iron manganese black, spinel black, carbon black; (iii) color pigments, such as ultramarine green, ultramarine blue, manganese blue, ultramarine violet, manganese violet, iron oxide red, molybdate red, ultramarine red, iron oxide brown, mixed brown, spinel and corundum phases, iron oxide yellow, bismuth vanadate; (iv) filer pigments, such as silicon dioxide, quartz flour, aluminum oxide, aluminum hydroxide, natural mica, natural and precipitated chalk, barium sulphate and (vi) mixtures thereof.

Embodiment 16: aqueous coating composition according to embodiment 14 or 15, characterized that the organic coloring pigment is selected from (i) monoazo pigments such as C.I. Pigment Brown 25, C.I. Pigment Orange 5, 36 and 67, C.I. Pigment Orange 5, 36 and 67, C.I. Pigment Red 3, 48:2, 48:3, 48:4, 52:2, 63, 112 and 170 and C.I. Pigment Yellow 3, 74, 151 and 183; (ii) diazo pigments such as C.I. Pigment Red 144, 166, 214 and 242, C.I. Pigment Red 144, 166, 214 and 242 and C.I. Pigment Yellow 83; (iii) anthraquinone pigments such as C.I. Pigment Yellow 147 and 177 and C.I. Pigment Violet 31; (iv) benzimidazole pigments such as C.I. Pigment Orange 64; (v) quinacridone pigments such as C.I. Pigment Orange 48 and 49, C.I. Pigment Red 122, 202 and 206 and C.I. Pigment Violet 19; (vi) quinophthalone pigments such as C.I. Pigment Yellow 138; (vii) diketopyrrolopyrrole pigments such as C.I. Pigment Orange 71 and 73 and C.I. Pigment Red, 254, 255, 264 and 270; (viii) dioxazine pigments such as C.I. Pigment Violet 23 and 37; (ix) indanthrone pigments such as C.I. Pigment Blue 60; (x) isoindoline pigments such as C.I. Pigment Yellow 139 and 185; (xi) isoindolinone pigments such as C.I. Pigment Orange 61 and C.I. Pigment Yellow 109 and 110; (xii) metal complex pigments such as C.I. Pigment Yellow 153; (xiii) perinone pigments such as C.I. Pigment Orange 43; (xiv) perylene pigments such as C.I. Pigment Black 32, C.I. Pigment Red 149, 178 and 179 and C.I. Pigment Violet 29; (xv) phthalocyanine pigments such as C.I. Pigment Violet 29, C.I. Pigment Blue 15, 15:1, 15:2, 15:3, 15:4, 15:6 and 16 and C.I. Pigment Green 7 and 36; (xvi) aniline black such as C.I. Pigment Black 1; (xvii) azomethine pigments; and (xviii) mixtures thereof.

Embodiment 17: aqueous coating composition according to any of embodiments 14 to 16, characterized that the effect pigment is selected from the group consisting of (i) plate-like metallic effect pigments such as plate-like aluminum pigments, gold bronzes, fire-colored bronzes, iron oxide-aluminum pigments; (ii) pearlescent pigments, such as metal oxide mica pigments; (iii) plate-like graphite pigments; (iv) plate-like iron oxide pigments; (v) multi-layer effect pigments from PVD films; (vi) liquid crystal polymer pigments; and (vii) mixtures thereof.

Embodiment 18: aqueous coating composition according to any of the preceding embodiments, characterized that the at least one pigment P is present in a total amount of 1 to 40 wt.-%, preferably 2 to 20 wt.-%, based on the total weight of the aqueous coating composition.

Embodiment 19: aqueous coating composition according to any of the preceding embodiments, characterized that the coating composition comprises a total amount of less than 2 wt.-%, preferably 0 wt.-%, based on the total weight of the coating composition, of at least one crosslinking agent.

Embodiment 20: aqueous coating composition according to embodiment 19, characterized that the crosslinking agent is selected from the group consisting of amino resins, polyisocyanates, blocked polyisocyanates, polycarbodiimides, photoinitiators, and mixtures thereof.

Embodiment 21: aqueous coating composition according to any of the preceding embodiments, characterized that the coating composition further comprises at least one coating additive selected from the group consisting of are (i) UV absorbers; (ii) light stabilizers such as HALS compounds, benzotriazoles or oxalanilides; (iii) rheology modifiers such as sagging control agents (urea crystal modified resins), organic thickeners and inorganic thickeners; (iv) free-radical scavengers; (v) slip additives; (vi) polymerization inhibitors; (vii) defoamers; (viii) wetting agents; (ix) fluorine compounds; (x) adhesion promoters; (xi) leveling agents; (xii) film-forming auxiliaries such as cellulose derivatives; (xiii) fillers, such as nanoparticles based on silica, alumina or zirconium oxide; (xiv) flame retardants; and (xv) mixtures thereof.

Embodiment 22: a mixer kit for producing aqueous coating compositions, comprising:

at least one first container (C1) comprising a tinting base containing at least one color and/or effect pigment and at least one binder, at least a second container (C2) comprising a pigment-free aqueous base varnish containing at least one binder;

at least a third container (C3) containing a silane-based composition comprising at least one silane-based compound R having an isocyanate content of less than 1% and obtained by reacting the free isocyanate groups of at least one aliphatic, cycloaliphatic, araliphatic and aromatic polyisocyanate with at least one silane compound of general formula (I)

$$HN\left[X - SiR_a^1(OR^2)_{3-a}\right]_n\left[X' - SiR_b^1(OR^2)_{3-b}\right]_m\left[R^3\right]_{2-(m+n)} \quad (I)$$

wherein

X, X' represent, independently from each other, linear and/or branched alkylene or cycloalkylene radicals having 1 to 20 carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl;

$R^3$ represents a linear and/or branched alkylene or cycloalkylene radicals having 1 to 20 carbon atoms;

n, m being, independently from each other, 1 or n being 1 and m being 0; and a, b being, independently from each other 0 to 2;

optionally at least one organic solvent; and optionally a fourth container (C4) comprising a pigment-free rheology module containing at least one inorganic and/or organic thickener.

Embodiment 23: a method for producing an aqueous coating composition from the mixer kit according to embodiment 22, comprising mixing of at least one base color composition with a pigment-free aqueous composition, a silane-based composition and optionally a pigment-free rheology module.

Embodiment 24: a method for forming a multilayer coating (MC) on a substrate (S) comprising the following steps:

(1) applying an aqueous coating composition of any of embodiments 1 to 21 or an aqueous coating composition prepared according to embodiment 23 on the substrate (S);

(2) forming a basecoat film from the coating composition applied in step (1);

(3) applying a clearcoat composition to a resulting basecoat film; and (4) jointly curing the basecoat film and the clearcoat film.

Embodiment 25: method according to embodiment 24, characterized in that the substrate (S) is selected from metallic substrates, metallic substrates coated with a cured electrocoat and/or a cured filler, plastic substrates and substrates comprising metallic and plastic components, especially preferably from metallic substrates.

Embodiment 26: method according to embodiment 25, characterized in that the metallic substrate is selected from the group comprising or consisting of iron, aluminum, copper, zinc, magnesium and alloys thereof as well as steel.

Embodiment 27: method according embodiment 24, characterized in that the substrate in step (1) is a multilayer coating possessing defect sites.

Embodiment 28: method according to any of embodiments 24 to 27, characterized in that the formation of the basecoat film in step (2) is performed at a temperature of 20 to 60° C. for a duration of 5 to 80 minutes, preferably performed at a temperature of 20 to 35° C. for a duration of 5 minutes to 70 minutes.

Embodiment 29: method according to any of embodiments 24 to 28, characterized in that the clearcoat composition comprises a) at least one silane-based compound R2 having an isocyanate content of less than 1%, preferably of 0.05 to 0%, and comprising at least one silane group of general formula (II)

$$* - NR^1 - X - SiR_a^2(OR^3)_{3-a} \quad (II)$$

and optionally at least one silane group of general formula (III)

$$* - N\left[X - SiR_a^2(OR^3)_{3-a}\right]_n\left[X' - SiR_b^2(OR^3)_{3-b}\right]_m \quad (III)$$

wherein

X, X' are, independently from each other, linear and/or branched alkylene or cycloalkylene radicals having 1 to 20 carbon atoms, preferably linear alkylene radicals having 3 carbon atoms;

$R^1$ is an alkyl group containing 1 to 10 carbon atoms, preferably 4 carbon atoms;

$R^2$, $R^3$ are, independently from each other, alkyl, cycloalkyl, aryl, or aralkyl groups, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl, preferably a $C^1$ alkyl group;

m, n being, independently from each other, 0 to 2, with the proviso that m+n=2, and a, b being, independently from each other, 0 to 2, preferably 0;

(a) at least one catalyst C1 of formula (IV)

$$z\left[C(R^4)(R^5)(R^6) - (CH_2)_n - C(=O) - O^-\right]M^{z+} \quad (IV)$$

wherein $R^4$ to $R^6$ are, independently from each other, hydrogen or alkyl groups containing 1 to 6 carbon atoms, with the proviso that the sum of the number of carbon atoms in residues $R^4$ to $R^6$ ranges from 3 to 8, preferably from 3 to 5 or from 5 to 7;

z being 1 to 4, preferably 1 or 4; and n being 0 or 1 to 8, preferably 0 or 4 with the proviso that, if z=1, then M is selected from the group consisting of Li, K and Na;

if z=2, then M is selected from the group consisting of Zn and Zr;

if z=3, then M is selected from the group consisting of Bi and Al;

if z=4, then M is selected from the group consisting of Zr and Ti; and (b) at least one aprotic organic solvent.

Embodiment 30: method according to embodiment 29, characterized in that the clearcoat composition comprises the silane-based compound R2 (a) in a total amount of 25 to 95 wt.-%, preferably 35 to 90 wt.-%, very preferably 40 to 80 wt.-%, based on the total weight of the clearcoat composition.

Embodiment 31: method according to embodiment 29 or 30, characterized in that the clearcoat composition comprises the at least one catalyst C1 (b) of general formula (IV) in a total amount of 1 to 50 mmol, preferably 5 to 40 mmol, very preferably 15 to 25 mmol metal per 100 g silane-based compound R2 (a) solid.

Embodiment 32: method according to any of embodiments 29 to 31, characterized in that the clearcoat composition additionally comprises at least one second catalyst C2, selected from metal alkoxides of the general formula (V)

$$M^1[(OR^7)_m(R^8)_{n-m}]_n \qquad (V)$$

wherein

R$^7$ is a linear or branched C$_1$ to C$_{10}$ alkyl group, preferably a C$_3$ to C$_5$ alkyl group;

R$^6$ is a halogen group, an acetylacetonate group, an alkyl acetoacetate group or an ethanolaminato group, preferably an ethyl acetoacetate group;

M$^1$ represents at least one metal selected from silicon, titanium, tantalum, zirconium, boron, aluminum, magnesium or zinc, preferably titanium;

m is an integer from 0 to 4, preferably 0; and n represents a valence of 2 to 5 of M$^1$, preferably a valence of 4.

Embodiment 33: method according to any of embodiments 29 to 32, characterized in that the weight ratio of catalyst C1 (b) of general formula (IV) to the at least one second catalyst C2, preferably titanium (IV) isopropoxide and/or titanium (IV) n-butoxide and/or titanium (IV) bis (ethyl acetoacetate)diisopropoxide, is from 1:2 to 8:1, preferably from 1:1 to 4:1, more preferably from 1:1 to 3:1, very preferably 1.5:1.

Embodiment 34: method according to any of embodiments 24 to 33, characterized in that the joint curing in step (4) is performed at a temperature of 20 to 30° C. for a duration of 10 to 70 minutes, preferably 20 to 60 minutes.

Embodiment 35: multilayer coating (MC) produced by the method as claimed in any of embodiments 34 to 34.

Embodiment 36: use of a silane-based composition comprising at least one silane-based compound R having an isocyanate content of less than 1% and obtained by reacting the free isocyanate groups of at least one aliphatic, cycloaliphatic, araliphatic and aromatic polyisocyanate with at least one silane compound of general formula (I)

$$HN\left[X - SiR_a^1(OR^2)_{3-a}\right]_n\left[X' - SiR_b^1(OR^2)_{3-b}\right]_m\left[R^3\right]_{2-(m+n)} \qquad (I)$$

wherein

X, X' represent, independently from each other, linear and/or branched alkylene or cycloalkylene radicals having 1 to 20 carbon atoms;

R$^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or NR$_a$ groups, where R$_a$ is alkyl, cycloalkyl, aryl, or aralkyl;

R$^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or NR$_a$ groups, where R$_a$ is alkyl, cycloalkyl, aryl, or aralkyl;

R$^3$ represents a linear and/or branched alkylene or cycloalkylene radicals having 1 to 20 carbon atoms;

n, m being, independently from each other, 1 or n being 1 and m being 0; and a, b being, independently from each other 0 to 2;

and optionally at least one organic solvent as hardening additive in aqueous basecoat compositions, preferably aqueous refinish basecoat compositions.

Examples

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination:

1.1 Solids Content (Solids, Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 130° C. for 60 minutes, cooling it in a desiccator and then reweighing it. The residue relative to the total amount of sample used corresponds to the nonvolatile fraction.

1.2 Isocyanate Content (NCO Content)

The isocyanate content was determined by adding an excess of a 2% N,N-dibutylamine solution in xylene to a homogeneous solution of the sample in acetone/N-ethyl pyrrolidone (1:1 vol %), by potentiometric back-titration of the amine excess with 0.1 N hydrochloric acid, in a method based on DIN EN ISO 3251:2008-06, DIN EN ISO 11909: 2007-05, and DIN EN ISO 14896:2009-07. The NCO content of the silane-based compound R, based on solids, can be calculated via the fraction of the polymer (solids content) in solution.

1.3 Preparation of Multilayer Coatings (MC)

Steel panels were first pretreated with Gardobond R zinc phosphatation (commercially available from Chemetall GmbH) and afterwards coated with ED-coat (Cathogard 800, commercially available from BASF Coatings GmbH) in a dry film thickness of 17 to 25 μm.

Afterwards, the electrodeposited panels were coated as described below using a pneumatic spray gun at a temperature of 25° C. and a relative humidity of 65%. A primer (Glasurit 285-230) was applied to the electrodeposited panels such that the film thickness after curing at 60° C. was 50 to 70 μm. The primer was subsequently sanded and the freshly formulated basecoat compositions BC1 to BC11 were applied such that the film thickness after flash-off till touch dry for approximately 30 minutes was 10 to 20 μm. In the last step a polyisocyanate-free silane-based clearcoat composition C1 was applied on top of the respective basecoat layer and allowed to cure at ambient conditions till touch dry for approximately 30 minutes. The dry film thickness of the clearcoat layer was 35 to 80 μm. For each basecoat composition, two panels were prepared as previously described.

1.4 Test Measurements

One week after preparation of the multilayer coating, the following adhesion tests were performed: cross-cut adhesion, steam jet adhesion and stone chip adhesion. In addition, a second panel was transferred to a climate chamber with 40° C. and 100% humidity for 240 h. After this procedure cross-cut adhesion, steam jet adhesion and stone chip adhesion was again tested 24 h after humidity exposure. Additionally, the panels were visually assessed 1 h and 24 h after humidity exposure.

1.4.1 Cross-Cut Adhesion

Cross-cut adhesion was performed according to DIN EN ISO 2409:2013-06.

1.4.2 Steam Jet Adhesion

Steam jet adhesion was performed according to DIN 55662:2009-12.

1.4.3 Stone Chip Adhesion

Stone chip adhesion test and evaluation was performed according to DIN EN ISO 20567-1:2017-07 and DIN 55996-1:2001-04.

1.4.3 Visual Evaluation of Blistering and Whitening after Humidity Exposure

Visual evaluation of blistering and whitening after humidity exposure was performed according to DIN EN ISO 4628-2:2016-07.

2. Preparation of Different Silane-Based Compositions R1 to R8

The respective isocyanate compound was diluted with butyl acetate and the corresponding amino silane was added dropwise over time. The vessel temperature was held in the range of 60 to 70° C. The reaction was completed when full conversion of the NCO groups of the isocyanate compound were determined by titration as described in point 1.2. The isocyanate and amino silane compounds used to prepare silane-based compositions R1 to R8 as well as the solid content and NCO-content of the prepared compositions are stated in Table 1.

TABLE 1

| Ingredients used to prepare silane-based compositions R1 to R8, solid content and NCO-content of compositions R1 to R8 | | | | | | | | |
|---|---|---|---|---|---|---|---|---|
| Ingredient | R1 | R2 | R3 | R4 | R5 | R6 | R7 | R8 |
| Silane compound of formula (I) [1] | 28.38 | 36.68 | 32.57 | 28.50 | 51.12 | 64.21 | 57.82 | 51.31 |
| Silane compound of formula (I) [2] | 19.55 | 25.28 | 22.44 | 19.64 | — | — | — | — |
| Desmodur N 3400 [3] | 32.07 | — | — | — | 28.88 | — | — | — |
| HDI [4] | — | 18.04 | — | — | — | 15.79 | — | — |
| Desmodur W [5] | — | — | 24.98 | — | — | — | 22.18 | — |
| Desmodur N 3300 [6] | — | — | — | 31.87 | — | — | — | 28.69 |
| Butyl acetate | 20 | 20 | 20 | 20 | 20 | 20 | 20 | 20 |
| Solid content [%] | 79.0 | 79.3 | 80.3 | 80.1 | 79.0 | 79.3 | 80.3 | 80.1 |
| NCO content [%] | 0 | 0 | 0 | 0 | 0 | 0 | 0.03 | 0.03 |

[1] X = X' = linear $C_3$ alkylene group, $R^1 = R^2$ = methyl group, n = m = 1 and a = b = 0
[2] X = linear $C_3$ alkylene group, $R^1 = R^2$ = methyl group, $R^3$ = linear $C_4$ alkylene group, n = 1, m = 0 and a = b = 0)
[3] aliphatic polyisocyanate (HDI uretdione), NCO content = 21.8% (supplied by Covestestro Deutschland AG)
[4] hexamethylene diisocyanate
[5] liquid cycloaliphatic diisocyanate (H12MDI), NCO content = 31.8% (supplied by Covestro Deutschland AG)
[6] aliphatic polyisocyanate (HDI trimer), NCO-content = 21.8% (supplied by Covestro Deutschla nd AG)

3. Preparation of Aqueous Basecoat Compositions BC1 to BC11

Basecoat materials 90-M4, 90-1250, and 93-E 3 are commercially available from BASF Coatings GmbH under the brand Glasurit. The respective inventive aqueous basecoat composition BC4 to BC11 was formulated as follows: the silane-based composition (i.e. R1 to R8 prepared according to point 2. above) was added to a mixture of mixing clear (90-M4) and black pigment paste (90-1250) and stirred till a homogenous suspension was obtained. This mixture was then diluted with adjusting base (93-E 3). The non-inventive basecoat composition BC1 was prepared by adding the black pigment paste (90-1250) to the mixing clear (90-M4) and stirring till a homogenous suspension was obtained. This mixture was then diluted with adjusting base (93-E 3). The non-inventive basecoat compositions BC2 and BC3 were prepared in the same manner as non-inventive basecoat composition BC1, however, the respective amount of commercially available (3-glycidyloxypropyl)trimethoxysilane (GPTS) was additionally added after dilution with adjusting base (93-E 3). Exact formulations are displayed in Table 2. The prepared aqueous basecoat compositions were applied directly after preparation as described in point 1.3.

TABLE 2

| Formulation of basecoat compositions BC1 to BC11 | | | | | | | | | | | |
|---|---|---|---|---|---|---|---|---|---|---|---|
| | BC1 | BC2 | BC3 | BC4* | BC5* | BC6* | BC7* | BC8* | BC9* | BC10* | BC11* |
| 90-M4 | 46.67 | 46.44 | 46.20 | 42.39 | 42.39 | 42.43 | 42.43 | 42.39 | 42.39 | 42.43 | 42.43 |
| 90-1250 | 20.00 | 19.90 | 19.80 | 18.17 | 18.17 | 18.18 | 18.18 | 18.17 | 18.17 | 18.18 | 18.18 |
| R1 | — | — | — | 9.17 | — | — | — | — | — | — | — |

TABLE 2-continued

Formulation of basecoat compositions BC1 to BC11

| | BC1 | BC2 | BC3 | BC4* | BC5* | BC6* | BC7* | BC8* | BC9* | BC10* | BC11* |
|---|---|---|---|---|---|---|---|---|---|---|---|
| R2 | — | — | — | — | 9.17 | — | — | — | — | — | — |
| R3 | — | — | — | — | — | 9.09 | — | — | — | — | — |
| R4 | — | — | — | — | — | — | 9.09 | — | — | — | — |
| R5 | — | — | — | — | — | — | — | 9.17 | — | — | — |
| R6 | — | — | — | — | — | — | — | — | 9.17 | — | — |
| R7 | — | — | — | — | — | — | — | — | — | 9.09 | — |
| R8 | — | — | — | — | — | — | — | — | — | — | 9.09 |
| 93-E 3 | 33.33 | 33.16 | 33.00 | 30.27 | 30.27 | 30.30 | 30.30 | 30.27 | 30.27 | 30.30 | 30.30 |
| (3-glycidyloxypropyl)-trimethoxysilane | — | 0.5 | 1.0 | — | — | — | — | — | — | — | — |

*inventive

4. Preparation of Clearcoat Composition C1

The clearcoat composition C1 was prepared as disclosed in EP 19172732 according to the following procedure:

The ingredients I of Table 3 were mixed and afterwards pre-mixed ingredients II were added. All amounts in Table 3 are given in parts by weight (i.e. in gram). The resulting clearcoat composition C1 had a nonvolatile content of 55%

TABLE 3

Formulation of clearcoat composition C1

| | Ingredients | NVC** | Amount |
|---|---|---|---|
| I | Butyl acetate | 0 | 152.95 |
| | Leveling additive | 10 | 7.00 |
| | K-neodecanoate/free neodecanoic acid (44/56 w/w) | 90 | 32.20 |
| | titanium (IV) isopropoxide | 97 | 9.80 |

TABLE 3-continued

Formulation of clearcoat composition C1

| | Ingredients | NVC** | Amount |
|---|---|---|---|
| | HALS | 20 | 20.30 |
| | UV-Absorber 1 | 85 | 6.3 |
| II | Silane-based compound R2 [1] | 69.8 | 448.00 |
| | (3-glycidyloxypropyl)trimethoxysilane | 100 | 23.45 |

**NVC = non-volatile content

[1] Silane-based compound R2 (a) was prepared by reacting 25.52 g 4,4'-methylene bis(cyclohexyl isocyanate) (Desmodur W) with two equivalents N-(n-butyl)-3-aminopropyltrimethoxysilane (44.48 g) in 20 g butyl acetate and 10 g butanone at 60° C. until the NCO content reached 0.23%

5. Results

The results obtained for the multilayer coatings prepared according to point 1.3 using basecoat compositions BC1 to BC11 and clearcoat composition C1 are listed in Tables 4 to 6.

TABLE 4

Results of adhesion tests on multilayer coatings MC1 to MC11 prepared from BC1 to BC11 and C1 (performed 7 days after preparation of said multilayer coatings MC1 to MC11)

| | MC1 BC1 + C1 | MC2 BC2 + C1 | MC3 BC3 + C1 | MC4* BC4 + C1 | MC5* BC5 + C1 | MC6* BC6 + C1 | MC7* BC7 + C1 | MC8* BC8 + C1 | MC9* BC9 + C1 | MC10* BC10 + C1 | MC11* BC11 + C1 |
|---|---|---|---|---|---|---|---|---|---|---|---|
| Cross-cut adhesion | 1 | 1 | 1 | 1 | 1 | 1 | 1 | 1 | 2 | 1 | 1 |
| Stone chipping | 2.5 | 3.0 | 3.0 | 2.5 | 2.5 | 2.5 | 2.5 | 2.5 | 2.5 | 2.5 | 2.5 |
| Steam jet adhesion C1 | 5a | 5a | 5a | 1a | 1a | 2a | 1a | 1a | 1a | 1a | 1a |
| Steam jet adhesion BC/filler | 5a | 5a | 5a | 1a | 1a | 1a | 1a | 1a | 1a | 1a | 1a |

*inventive

TABLE 5

Results of adhesion tests on multilayer coatings MC1 to MC11 prepared from BC1 to BC11 and C1 (performed 24 h after removing the respective panel from the constant climate chamber)

| | MC1' BC1 + C1 | MC2' BC2 + C1 | MC3' BC3 + C1 | MC4'* BC4 + C1 | MC5'* BC5 + C1 | MC6'* BC6 + C1 | MC7'* BC7 + C1 | MC8'* BC8 + C1 | MC9'* BC9 + C1 | MC10'* BC10 + C1 | MC11'* BC11 + C1 |
|---|---|---|---|---|---|---|---|---|---|---|---|
| Cross-cut adhesion | 3 | 3 | 3 | 2 | 2 | 2 | 2 | 2 | 2 | 2 | 2 |
| Stone chipping | 2.5 | 2.5 | 2.5 | 3.0 | 2.5 | 2.5 | 2.5 | 2.5 | 2.5 | 2.5 | 2.5 |
| Steam jet adhesion C1 | 5a | 5a | 4a | 1a | 1a | 1a | 1a | 1a | 1a | 1a | 1a |

TABLE 5-continued

Results of adhesion tests on multilayer coatings MC1 to MC11 prepared from BC1 to BC11 and C1 (performed 24 h after removing the respective panel from the constant climate chamber)

| | MC1' BC1 + C1 | MC2' BC2 + C1 | MC3' BC3 + C1 | MC4'* BC4 + C1 | MC5'* BC5 + C1 | MC6'* BC6 + C1 | MC7'* BC7 + C1 | MC8'* BC8 + C1 | MC9'* BC9 + C1 | MC10'* BC10 + C1 | MC11'* BC11 + C1 |
|---|---|---|---|---|---|---|---|---|---|---|---|
| Steam jet adhesion BC/filler | 4a | 4a | 4a | 1a | 1a | 1a | 1a | 1a | 1a | 1a | 1a |

*inventive

TABLE 6

Results of visual inspection of multilayer coatings MC1' to MC11' prepared from BC1 to BC11 and C1 (visual insection was performed 1 h and 24 h after removing the respective panels from the constant climate chamber)

| | | MC1' BC1 + C1 | MC2' BC2 + C1 | MC3' BC3 + C1 | MC4'* BC4 + C1 | MC5'* BC5 + C1 | MC6'* BC6 + C1 | MC7'* BC7 + C1 | MC8'* BC8 + C1 | MC9'* BC9 + C1 | MC10'* BC10 + C1 | MC11'* BC11 + C1 |
|---|---|---|---|---|---|---|---|---|---|---|---|---|
| 1 h after removal | Swelling | slightly | no | no | slightly | slightly | slightly | slightly | slightly | slightly | slightly | slightly |
| | Clouding | no | slightly white | slightly white | no | no | no | no | no | no | no | no |
| | Blister density | no | m2g4 | m2g4 | no | no | no | no | no | no | no | no |
| | Cracks | no | yes | no | no | no | no | no | no | no | no | no |
| | Delamination | no | at crack | no | no | no | no | no | no | no | no | no |
| 24 h after removal | Swelling | no | no | no | no | no | no | no | no | no | no | no |
| | Clouding | slightly white | slightly white | slightly white | slightly white | no | slightly white | slightly white | no | no | no | no |
| | Blister density | no | blisters visible | blisters visible | no | no | no | no | no | no | no | no |
| | Cracks | no | yes | no | no | no | no | no | no | no | no | no |
| | Delamination | no | at crack | at blisters | no | no | no | no | no | no | no | no |

The inventive multilayer coatings MC4 to MC11 prepared from an isocyanate-free low-curing basecoat composition comprising the silane-based compound R exhibit a significantly improved steam jet adhesion when compared to the non-inventive multilayer coating MC1 not comprising said silane-based compound R or the non-inventive multilayer coatings MC2 and MC3 comprising a silane compound not corresponding to the claimed silane-based compound R (see Table 4). However, the mechanical properties—such as the stone chipping property—is not negatively influenced by addition of the silane-based compound R to the basecoat compositions.

The improved steam jet adhesion is also obtained after the inventive multilayer coatings MC4' to MC11' have been kept for several hours under defined humidity conditions (see Table 5).

The addition of the silane-based compound R to the basecoat compositions does also not result in a negative impact on the swelling, clouding, blister density or delamination of the inventive multilayer coatings MC4' to MC11' when compared to the non-inventive multilayer coating MC1' after keeping said multilayer coatings several hours under defined humidity conditions (see Table 6). Surprisingly, the addition of the silane-based compound R to the basecoat composition BC4 to BC11 does not result in blistering, cracking or delamination while the addition of a commercially available silane compound to the non-inventive basecoat compositions BC2 and BC3 leads to blistering, cracking and delamination (see multilayer coatings MC2' and MC3'). Thus, at least two alkoxysilane moieties are necessary in the silane-based compound R to improve steam jet adhesion without negatively influencing the optical and coloristic properties of the basecoat layer.

In summary, the addition of the silane-based compound R to aqueous basecoat compositions results in improved steam jet adhesion of multilayer coatings prepared from said aqueous basecoat compositions without the use of undesirable isocyanate crosslinkers. The improved steam jet adhesion is obtained without negatively influencing the good mechanical and optical properties of the multilayer coatings containing said basecoat layer. The use of the silane-based compound R in aqueous basecoat compositions thus allows to provide isocyanate-free low curing coating systems which are especially suitable for refinish applications.

The invention claimed is:

1. An aqueous coating composition comprising:
a) at least one silane-based compound R having an isocyanate content of less than 1 mol % obtained by reacting free isocyanate groups of at least one aliphatic, cycloaliphatic, araliphatic and aromatic polyisocyanate with at least one silane compound of general formula (I)

$$HN\left[X - SiR_a^1(OR^2)_{3-a}\right]_n\left[X' - SiR_b^1(OR^2)_{3-b}\right]_m\left[R^3\right]_{2-(m+n)} \quad (I)$$

wherein

X, X' represent, independently from each other, linear and/or branched alkylene or cycloalkylene radicals having 1 to 20 carbon atoms;

$R^1$ represents an alkyl, cycloalkyl, aryl, or aralkyl group, it being possible for the carbon chain of the alkyl, cycloalkyl, aryl, or aralkyl groups to be interrupted by nonadjacent oxygen, sulfur, or $NR_a$ groups, where $R_a$ is alkyl, cycloalkyl, aryl, or aralkyl;

$R^2$ represents hydrogen, an alkyl, or a cycloalkyl group, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl;

$R^3$ represents a linear and/or branched alkylene or cycloalkylene radicals having 1 to 20 carbon atoms;

n, m being, independently from each other, 1 or n being 1 and m being 0; and a, b being, independently from each other 0 to 2; and b) at least one binder B being different from the silane-based compound of general formula (I); and c) at least one pigment P.

2. The aqueous coating composition according to claim 1, wherein the silane-based compound R has an isocyanate content of less than 0.5 mol %, as determined according to DIN EN ISO 14896:2009-07.

3. The aqueous coating composition according to claim 1, wherein X and X' in formula (I) represent, independently from each other, a linear alkylene radical having 1 to 10 carbon atoms.

4. The aqueous coating composition according to claim 1, wherein $R^2$ in formula (I) represent, independently from each other, a $C_1$-$C_{10}$ alkyl group.

5. The aqueous coating composition according to claim 1, wherein $R^3$ in formula (I) represents a linear $C_1$-$C_{10}$ alkyl group.

6. The aqueous coating composition according to claim 1, wherein a and b in formula (I) are, independently from each other, 0.

7. The aqueous coating composition according to claim 1, wherein the at least one silane-based compound R is present in a total amount of 1 to 20 wt.-%, based on a total weight of the coating composition.

8. The aqueous coating composition according to claim 1, wherein the binder B is selected from the group consisting of (i) poly(meth)acrylates, (ii) polyurethanes, (iii) polyesters, (iv) polyethers, (v) copolymers of the stated polymers, and (vi) mixtures thereof.

9. The aqueous coating composition according to claim 1, wherein the coating composition comprises a total amount of less than 2 wt.-%, based on a total weight of the coating composition, of at least one crosslinking agent.

10. A method for forming a multilayer coating (MC) on a substrate(S) comprising the following steps:

(1) applying an aqueous coating composition according to claim 1 on the substrate(S);

(2) forming a basecoat film from the coating composition applied in step (1);

(3) applying a clearcoat composition to a resulting basecoat film; and (4) jointly curing the basecoat film and the clearcoat film.

11. The method according to claim 10, wherein the clearcoat composition comprises

34 a) at least one silane-based compound R2 having an isocyanate content of less than 1% and comprising at least one silane group of general formula (II)

$$* - NR^1 - X - SiR_a^2(OR^3)_{3-a} \qquad \text{(II)}$$

and optionally at least one silane group of general formula (III)

$$* - N\left[X - SiR_a^2(OR^3)_{3-a}\right]_n\left[X' - SiR_b^2(OR^3)_{3-b}\right]_m \qquad \text{(III)}$$

wherein

X, X' are, independently from each other, linear and/or branched alkylene or cycloalkylene radicals having 1 to 20 carbon atoms;

$R^1$ is an alkyl group containing 1 to 10 carbon atoms, $R^2$, $R^3$ are, independently from each other, alkyl, cycloalkyl, aryl, or aralkyl groups, it being possible for the carbon chain of the alkyl, cycloalkyl, aryl, or aralkyl groups to be interrupted by nonadjacent oxygen, sulfur or $NR_a$ groups, where $R_a$ is alkyl, cycloalkyl, aryl, or aralkyl, m, n being, independently from each other, 0 to 2, with the proviso that m+n=2, and a, b being, independently from each other, 0 to 2;

b) at least one catalyst C1 of formula (IV)

$$z\left[C(R^4)(R^5)(R^6) - (CH_2)_n - C(=O) - O^-\right]M^{z+} \qquad \text{(IV)}$$

wherein $R^4$ to $R^6$ are, independently from each other, hydrogen or alkyl groups containing 1 to 6 carbon atoms, with the proviso that a sum of the number of carbon atoms in residues $R^4$ to $R^6$ ranges from 3 to 8;

z being 1 to 4; and n being 0 or 1 to 8;

with the proviso that, if z=1, then M is selected from the group consisting of Li, K and Na;

if z=2, then M is selected from the group consisting of Zn and Zr;

if z=3, then M is selected from the group consisting of Bi and Al;

if z=4, then M is selected from the group consisting of Zr and Ti; and c) at least one aprotic organic solvent.

12. The aqueous coating composition according to claim 1, wherein the silane-based compound R has an isocyanate content of 0.05 to 0 mol %, as determined according to DIN EN ISO 14896:2009-07.

13. The aqueous coating composition according to claim 1, wherein X and X' in formula (I) represent, independently from each other, a linear alkylene radical having 1 to 6 carbon atoms.

14. The aqueous coating composition according to claim 1, wherein $R^2$ in formula (I) represent, independently from each other, a $C_1$-$C_6$ alkyl group.

15. The aqueous coating composition according to claim 1, wherein $R^3$ in formula (I) represents a linear $C_1$-$C_6$ alkyl group.

* * * * *